Patented Nov. 3, 1931

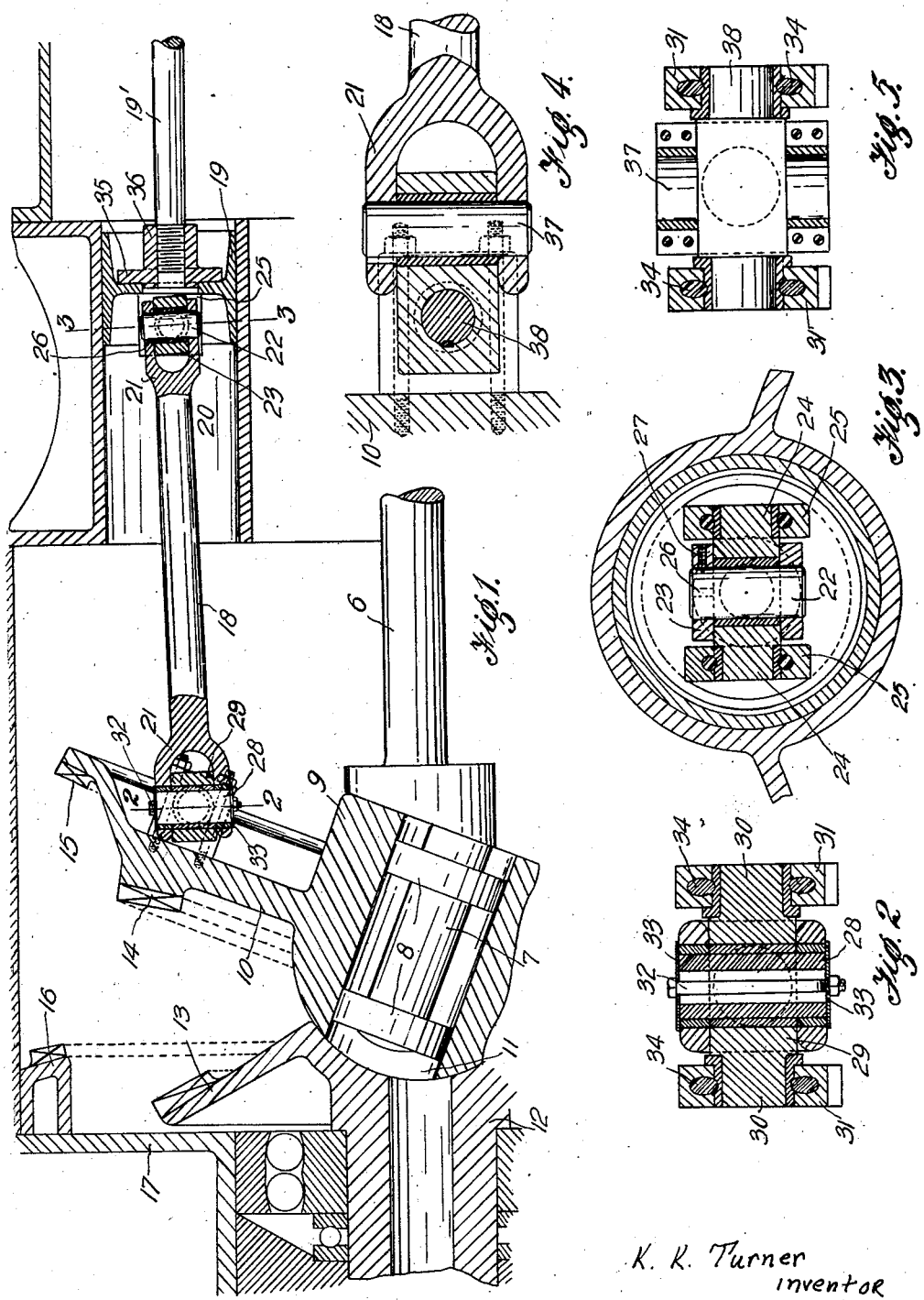

1,830,303

UNITED STATES PATENT OFFICE

KENNETH KESTELL TURNER, OF MELBOURNE, VICTORIA, AUSTRALIA

ENGINE AND PUMP

Application filed December 15, 1926, Serial No. 155,020, and in Australia December 23, 1925.

This invention relates to improvements in engines and pumps and refers especially to engines, pumps and compressors of the "crankless" type or wherein a swash plate, or wabbler disc or wheel mechanism is interposed between the piston elements and the driving shaft for the interconversion of reciprocating and rotary motion.

The object of the invention is to provide improvements in universal couplings for the rods connecting pistons or cross heads to the wabbler disc or wheel or equivalent member whereby an even distribution of load over all bearing surfaces and effective flexibility and durability will be ensured.

I accomplish the abovementioned object by providing means for connecting the ends of a piston or like rod to a wabbler disc and to a piston, crosshead or like element whereby the said ends will be positively connected and be capable of more than one dimensional movement relatively to the parts to which they are affixed.

More particularly the invention may consist in providing a piston or connecting rod with a fork at each end having opposed holes adapted to accommodate pins passing through members having trunnions or pivot pins (arranged at right angles to those passing through the ends of the rod) mounted in blocks secured to the piston or crosshead and to the wabbler disc or wheel.

The trunnions or pivot pins at each end of the piston or connecting rod can be arranged in the same transverse plane or in parallel planes and the pivotal devices at the ends of the rod are constructed and arranged whereby they can be easily and quickly assembled and detached as and when required.

The wabbler disc or wheel can be designed and arranged in various ways and in this specification, wherever the term "wabbler disc" is used, it is intended to include, inter alia, a cage or member adapted to be connected to the piston or connecting rods whereby driving pressure can be transmitted to a swash plate by means of interposed bearing pads or antifrictional members.

In order that the invention, the object and nature of which have been set forth, may be readily understood, reference will now be had to the accompanying sheet of explanatory drawings wherein:

Figure 1 is a view in sectional elevation of part of a "crankless" engine or pump fitted with improvements constructed in accordance with the present invention.

Figure 2 is a view in sectional end elevation taken on the dotted line 2—2 of Figure 1.

Figure 3 is a view in sectional end elevation taken on the dotted line 3—3 of Figure 1.

Figure 4 is a view similar to Figure 2 and shows a modification of the invention.

Figure 5 is a view in sectional elevation showing a further modification of the invention which hereinafter will be fully described.

In these drawings like characters of reference have been employed to indicate the same or corresponding parts in the different views and the numeral 6 designates a high speed shaft having an inclined crank 7 on one end thereof rotatively mounted in antifrictional bearings 8 fitted with a hub 9 of a reciproundulatory member or wabbler wheel 10.

The end of the hub 9 remote from the high speed shaft is of spherical formation and is accommodated in a corresponding spherical recess 11 formed in the end of a driving shaft 12, furnished with a bevel driving gear 13 adapted to mesh with a ring of gear teeth 14 having a smaller or larger number of teeth formed on or fitted to the wabbler wheel.

The wabbler wheel is provided with a second ring of teeth 15 which is adapted to mesh with a ring of teeth 16 rigidly mounted in the casing 17 and having the same number of teeth.

The side of the wabbler wheel opposite to that furnished with the rings of gear teeth is connected by piston or connecting rods 18 to a plurality of crossheads 19 reciprocatingly mounted in symmetrically arranged guides 20.

In Figure 1 of the drawings only one connecting rod and crosshead are shown and one end of a piston rod 19′ is shown connected to the cross head.

The piston or connecting rod 18 is provided with a fork 21 at each end having opposed holes to accommodate trunnions or pivot pins carried on members provided with right angle pivot pins which are journalled in members connected to the piston or crosshead and to the wabbler disc or wheel.

In one construction the fork 21 at the small end of the rod is pivotally mounted on a pin 22 which passes through a member 23 having trunnions 24 pivotally supported in bearing blocks 25 bolted or otherwise secured to the crosshead 19, piston or like reciprocating member.

The pivot pin 22 passing through the member 23 provided with the trunnions is furnished with a key-way adapted to receive a key 26 which engages with a recess formed in the forked end of the rod whereby the said pivot pin will have a fixed relation thereto, or alternatively, the said pivot pin may be retained in position by a set screw 27 (shown in dotted lines in Figure 3), or by other approved means.

The axes of the trunnions 24 and pivot pin 22 for the small end of the rod in this case are arranged in the same transverse plane.

The fork at the large end of the rod or that end which is connected to the oscillating or wabbling member 10 is pivotally mounted on a hollow pin 28 which passes through a member 29 having trunnions 30 projecting therefrom and supported in bearing blocks 31 fitted to the wabbling member.

The pivot pin 28 for the large end of the piston or connecting rod in this case is adapted to float and is retained in position by an axially disposed bolt 32 and end washers 33 or other approved means.

The bearing blocks supporting the pivot member 29 at the large end of the rod are secured by screw studs 34 or other approved means to the wabbling member.

The bolts securing the bearing blocks 25 forming the pivotal support for the members connecting the small end of the piston or connecting rod to the crosshead may pass through a collar 35 on a boss 36 mounted on the opposite side of the said crosshead and adapted to form a support or connection for one end of the piston rod 19'.

If preferred the members connecting the ends of the piston or connecting rod to the wabbler disc and to the crosshead or piston can be provided with holes disposed at right angles to each other and adapted to accommodate pivot pins 37 and 38 disposed in parallel planes. Both pivot pins in this case may be formed independently of or integrally with the connecting member, as shown in Figures 4 and 5 of the drawings.

It will be readily obvious that a connection constructed as hereinbefore described will permit of an even strain to be applied to all the bolts securing the blocks to their respective elements and the necessary amount of flexibility to permit of an even distribution of wear over all of the bearing faces when the parts are in operation.

The invention is simple in construction, durable in operation, and in use will be found thoroughly efficient for the purpose for which it has been devised.

I claim:—

In engines, pumps or compressors of the type having wobbler disc mechanism interposed between reciprocating elements and a driving shaft, for the inter-conversion of reciprocating and rotary motion, a universal joint for coupling a connecting rod to the wobbler disc comprising, a pair of bearing blocks on the wobbler disc, a bearing element having trunnions supported by the bearing blocks, and provided with an opening arranged at right angles to the trunnions, a hollow pivot pin journaled in the opening of the bearing element, a forked end on a connecting rod having holes engaging the projecting ends of the hollow pivot pin, washers on the ends of the hollow pivot pin and a bolt passing through the hollow pivot pin and washers for retaining the parts of the joint in their assembled positions.

In witness whereof I hereunto affix my signature.

KENNETH KESTELL TURNER.